(12) United States Patent
Lohr

(10) Patent No.: US 8,018,201 B2
(45) Date of Patent: Sep. 13, 2011

(54) BATTERY CHARGING APPARATUS

(75) Inventor: Guenter Lohr, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/263,805

(22) Filed: Nov. 3, 2008

(65) Prior Publication Data
US 2009/0051328 A1    Feb. 26, 2009

(51) Int. Cl.
H02J 7/00         (2006.01)
(52) U.S. Cl. .......................... 320/134; 320/135
(58) Field of Classification Search .................. 320/134
See application file for complete search history.

(56) References Cited

U.S. PATENT DOCUMENTS

| 3,517,295 | A |   | 6/1970  | Lapuyade          |         |
|-----------|---|---|---------|-------------------|---------|
| 3,735,233 | A | * | 5/1973  | Ringle            | 320/141 |
| 3,771,043 | A |   | 11/1973 | Zulaski           |         |
| 4,359,655 | A | * | 11/1982 | Fukui             | 327/397 |
| 4,390,828 | A |   | 6/1983  | Converse et al.   |         |
| 4,394,613 | A |   | 7/1983  | Cole              |         |
| 4,468,605 | A |   | 8/1984  | Fitzgerald et al. |         |
| 6,492,792 | B1| * | 12/2002 | Johnson et al.    | 320/136 |

FOREIGN PATENT DOCUMENTS

| DE | 1 671 903 | 10/1971 |
| DE | 92 09 120 | 9/1992  |
| GB | 1 202 742 | 8/1970  |
| GB | 1202742   | 8/1970  |
| GB | 1344346   | 1/1974  |

* cited by examiner

Primary Examiner — Edward Tso
Assistant Examiner — Samuel Berhanu
(74) Attorney, Agent, or Firm — Kenyon & Kenyon LLP

(57) ABSTRACT

The battery charging apparatus is made with small and low-cost components. It includes a first transistor (T1) with a control input through which the charging current flows into a battery (B) and a current source (T3, T4, R1, R2) for a control current flowing to the control input of the first transistor. The current source sets or adjusts the control current so that the first transistor is non-conducting or blocked and the charging current flowing into the battery is shut off when a predetermined maximum charging voltage is reached at the battery.

12 Claims, 1 Drawing Sheet

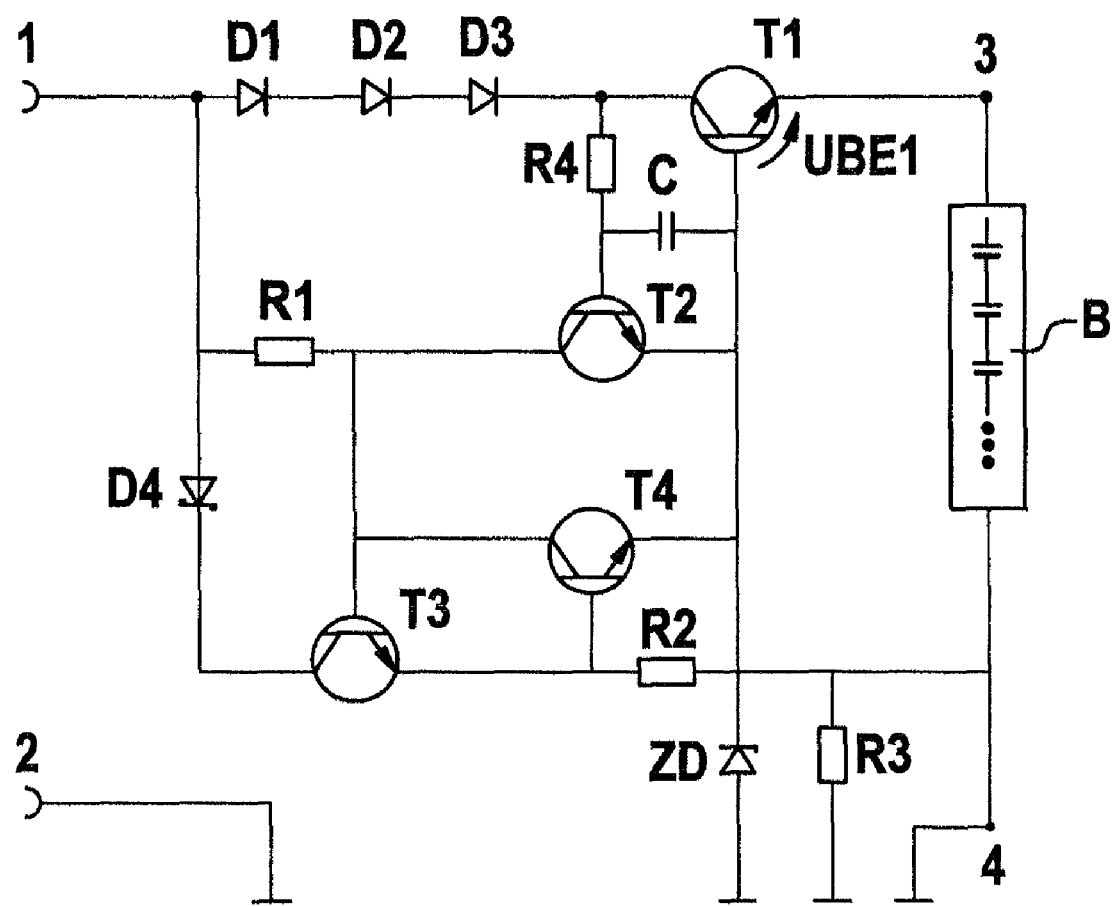

BATTERY CHARGING APPARATUS

CROSS-REFERENCE

This application claims the benefit of priority of U.S. patent application Ser. No. 10/895,221 filed on Jul. 20, 2004 and incorporated here by reference, which in turn claims the benefit of priority of German patent application No. 10335018.7 filed on Jul. 31, 2003.

BACKGROUND OF THE INVENTION

The present invention relates to an apparatus for charging a battery or a battery charging circuit. This battery charging circuit is especially suitable for charging batteries, whose charging can run under voltage control, like, for example, the case of lithium ion and lead batteries.

SUMMARY OF THE INVENTION

It is an object of the present invention to provide a miniaturized and inexpensive charging apparatus for charging a rechargeable battery, such as a lead or lithium ion battery.

The apparatus according to the invention for charging a battery has a first transistor, through which a charging current passes into the battery connected to the charging apparatus. A current source is connected to a control input of this first transistor to supply a control current to it. This current source adjusts or sets the control current for the first transistor so that the first transistor shuts off the charging current to the battery when a predetermined maximum charging or supply voltage is reached at the battery.

The apparatus of the present invention is embodied as a charging circuit, which is made from very small and also low-cost components.

Further advantageous embodiments are characterized by features claimed in the appended dependent claims.

In preferred embodiments a great simplification of the circuitry results when a Zener diode is connected to the control input of the first transistor. As soon as the charging voltage of the battery at the first transistor has reached a maximum value, the Zener voltage of the Zener diode is exceeded so that the control current no longer flows to the control input of the first transistor, but away through the Zener diode.

In further preferred embodiments it is appropriate to connect a second transistor to the first transistor, which keeps the control input of the first transistor at a potential, which is less than the charging voltage of the battery connected to the first transistor after shut off of the first transistor. Because of that in no case will even a small amount of charging current flow into the battery after shut off of the charging current through the first transistor.

A very high charging current can flow when the charging process is initiated, which could close or turn on the second transistor and thus interrupt the charging process. In order to prevent that occurrence the control input of the second transistor is connected to an R/C circuit means for delaying the switching on of the second transistor.

The current source works with reduced circuit work because several diodes are connected in series in a circuit branch through which the charging current is conducted and the current source picks off or taps the voltage drop across the diodes.

BRIEF DESCRIPTION OF THE DRAWING

The objects, features and advantages of the invention will now be illustrated in more detail with the aid of the following description of the preferred embodiments, with reference to the sole FIGURE, which is a schematic circuit diagram of a circuit arrangement for charging a rechargeable battery according to the invention.

DESCRIPTION OF THE PREFERRED EMBODIMENT

The circuit shown in the drawing for charging a battery has two input terminals 1 and 2, to which an unshown power supply is connectable and two output terminals 3 and 4, to which the battery B to be charged is connected. For example, the battery B to be charged is a lithium ion battery. The output terminal 3 is connected to the plus terminal of the battery B and the output terminal 4 is grounded. A plurality of diodes D1, D2 and D3 and a first transistor T1 are connected in series between the input terminal 1 and the output terminal 3. The first transistor T1 is connected in this series circuit branch so the charging current is supplied through its collector-emitter path to the battery B. The second input terminal 2 and the second output terminal 4 are both connected to ground.

The series circuit branch including diodes D1, D2 and D3, to which a current source is connected, causes a voltage drop in the charging current path. Also resistors can be used instead of diodes. Generally diodes have the advantage that the diode voltage is always constant, independent of charging current. This is usually not the case with conventional ohmic resistors. Also resistors heat up with high charging current.

The current source has two transistors T3 and T4. The base of the transistor T3 is connected with the collector of the transistor T4 and the base of the collector T4 is connected with the emitter of the transistor T3. The emitter of the transistor T4 is connected with the control input (base) of the first transistor T1. The collector of the transistor T3 is connected with the input terminal 1. Furthermore the base of the transistor T3 is also connected by means of a resistor R1 with the input terminal 1. The emitter of the transistor T2 and the base of the transistor T4 are connected via a resistor R2 to the control input of the transistor T1. Another diode D4 is connected between the input terminal 1 and the collector of the transistor T3. This diode D4 acts as a polarity protector in a known manner. The current source comprising the transistors T3 and T4 and resistors R1 and R2, as subsequently described, adjusts the control current supplied to the control input of the first transistor T1, so that the first transistor disconnects the battery B, when a predetermined maximum charging or supply voltage is reached at the battery, and thus interrupts the charging current from input terminal 1 to the output terminal 3.

A Zener diode ZD added between the control input of the first transistor T1 and ground in cooperation with the above-described current source causes the first transistor to become non-conducting when the battery reaches a predetermined maximum supply voltage and thus the charging current is interrupted. As long as the battery voltage at the output terminal 3 is less than the base-emitter voltage UBE1 of the first transistor T1, i.e. the Zener voltage of the Zener diode ZD, the control current supplied by the current source flows nearly completely into the control input (base) of the first transistor and it remains conducting. Only a small portion of the control current flows through a resistor R3 connected to ground and parallel to the Zener diode ZD. As soon as the battery charging voltage at the output terminal 3 has reached the base-emitter voltage UBE1 of the first transistor T1, i.e. a value corresponding to the Zener voltage ZD, a large portion of the control current supplied by the current source by means of the Zener diode ZD flows to ground. That means that the control current for the first transistor is so small that it is no longer sufficient to keep the first transistor T1 conducting. Then the first transistor T1 opens or becomes non-conducting and interrupts the charging current to the battery B.

An R/C circuit part, which comprises a resistor R4 and capacitor C, connects a base of a second transistor T2 to the collector of the first transistor T1. This guarantees that the first transistor T1 is no longer conducting when a predetermined maximum supply voltage is reached at the battery B and thus no charging current is supplied to the battery B. The emitter of the second transistor T2 is connected with the base of the first transistor T1 and its collector is connected with the current source. If now, as described previously, the maximum supply voltage is reached, the control current at the base of the first transistor T1 decreases, so that the voltage drop across the collector and base of this first transistor T1 increases. As a result, this voltage switches on the second transistor T2 and also the transistor T3 of the current source. The current source switches off the control current for the first transistor T1. Also now the second transistor T2, which forms a voltage divider together with the resistors R1 and R3, determines the voltage at the base of the first transistor T1. The dimensions of the resistors R1, R3 and the transistor T2 are selected so that the voltage at the base of the first transistor T1 is clearly less than the plus potential at the output terminal 3 connected to the battery B. Thus the base-emitter path of the transistor T1 is reliably blocked. No more current can flow into the charged battery B.

The R/C circuit part connected to the base of the second transistor T2 causes a delayed switching on of the second transistor T2. Because the turn-on of the second transistor T2 is delayed, the second transistor is blocked and the current source is prevented from being turned off, in cases in which a higher charging current should flow when the charging apparatus is turned on.

When the battery B comprises e.g. a lithium ion cell, a typical base-emitter voltage of the first transistor T1 of −5 V suffices for the charging process. The shut off voltage for the first transistor T1 is typically about −4.1 V. With two or more battery cells connected in series either a diode (not shown in the drawing) must be connected between the emitter of the first transistor T1 and the battery B, or a first transistor T1 with a higher permissible base-emitter voltage must be used.

It is advantageous to replace the single Zener diode ZD by a plurality of Zener diodes connected in series each with smaller Zener voltage in other embodiments, which have not been shown in the drawing. These Zener diodes have negative temperature coefficients, which compensates for the temperature behavior of the base-emitter voltage UBE1 of first transistor T1 and diode D4.

Also in other unshown embodiments a reference voltage for switching off the first transistor T1 can be produced with other circuit means instead of the Zener voltage of a Zener diode.

The disclosure in German Patent Application 103 35 018.7 of Jul. 31, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a battery charging apparatus, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. An apparatus for charging a battery, comprising:
a first transistor with a base, through which a charging current flows to a battery connected to the first transistor when said battery is being charged;
a current source for a control current for said transistor, said current source being connected to the base of the first transistor to supply said control current wherein said current source includes an adjusting arrangement for adjusting or setting said control current, so that the first transistor is non-conducting or blocked and said charging current flowing into said battery is shut off when a predetermined maximum charging voltage at said battery is reached;
a Zener diode arrangement, wherein said Zener diode arrangement is connected with said base of said first transistor, said Zener diode arrangement having a Zener voltage, wherein the Zener diode arrangement, in cooperation with the adjusting arrangement of the current source, causes the first transistor to become nonconducting when the battery reaches a predetermined maximum supply voltage so that the charging current is interrupted;
a second transistor, wherein an emitter of the second transistor is connected with the base of said first transistor, a base of said second transistor is connected with the collector of said first transistor via an resistor-capacitor circuit path, having a resistor and a capacitor, and the collector of said second transistor is connected to said current source,
wherein said second transistor keeps said control input of said first transistor at a potential that is less than the charging voltage of said battery connected to said first transistor after blocking said first transistor such that the base-emitter path of the first transistor is reliably blocked, and
wherein the current source includes a third transistor and a fourth transistor, a first resistor and a second resistor, wherein the base of the third transistor is connected with the collector of the fourth transistor and the base of the fourth transistor is connected with the emitter of the third transistor and the emitter of the third transistor and the base of the fourth transistor are connected via a second resistor with the base of the first transistor and the emitter of the fourth transistor is connected with the base of the first transistor.

2. The apparatus of claim 1, further comprising:
a resistor and capacitor circuit arrangement for delaying a switching on of the second transistor, wherein said R/C circuit arrangement is connected to a control input of the second transistor.

3. The apparatus of claim 1, further comprising:
a series circuit branch having a plurality of diodes and said first transistor connected in series with each other, wherein said current source is connected across said series circuit branch so that a voltage drop across said diodes drives said current source.

4. The apparatus of claim 1, further comprising:
- an R/C circuit arrangement for delaying a switching on of the second transistor, wherein said R/C circuit arrangement is connected to a control input of the second transistor; and
- a series circuit branch having a plurality of diodes and said first transistor connected in series with each other, wherein said current source is connected across said series circuit branch so that a voltage drop across said diodes drives said current source.

5. The apparatus of claim 4, wherein if the battery voltage at its output terminal is less than a base-emitter voltage of the first transistor, corresponding to the Zener voltage of the Zener diode arrangement, the control current supplied by the current source substantially flows into the control input of the first transistor so that it is conducting, and wherein if the battery charging voltage at the output terminal has reached the base-emitter voltage of the first transistor, corresponding to the Zener voltage, the control current supplied by the current source by the Zener diode arrangement substantially flows to ground, so that the first transistor becomes non-conducting and interrupts the charging current to the battery.

6. The apparatus of claim 1, wherein the adjusting arrangement includes a first adjusting transistor and a second adjusting transistor, a base of first adjusting transistor being connected with a collector of the second adjusting transistor, wherein a base of the second adjusting transistor is connected with an emitter of the first adjusting transistor, and wherein an emitter of the second adjusting transistor is connected with the control input of the first transistor, wherein the control input is the base of the first transistor.

7. The apparatus of claim 6, further comprising:
- an input terminal;
- wherein a collector of the first adjusting transistor is connected to the input terminal, wherein a base of the first adjusting transistor is connected by an electrical element to the input terminal, wherein an emitter of the second transistor and the base of the second adjusting transistor are connected via another electrical element to the control input of the first transistor.

8. The apparatus of claim 6, further comprising:
- an R/C circuit arrangement for delaying a switching on of the second transistor, wherein said R/C circuit arrangement is connected to a control input of the second transistor; and
- a series circuit branch having a plurality of diodes and said first transistor connected in series with each other, wherein said current source is connected across said series circuit branch so that a voltage drop across said diodes drives said current source.

9. The apparatus of claim 1, further comprising:
- an R/C circuit arrangement for delaying a switching on of the second transistor, wherein the R/C circuit arrangement is connected to the base of the second transistor so to cause a delayed switching on of the second transistor, wherein the turn-on of the second transistor is delayed, so that the second transistor is blocked and the current source is prevented from being turned off, and so that a higher charging current flows when the charging apparatus is turned on.

10. The apparatus of claim 1, wherein the Zener diode arrangement includes a plurality of Zener diodes connected in series, and wherein the plurality of Zener diodes have negative temperature coefficients so as to compensate for a temperature behavior of the base-emitter voltage of first transistor.

11. The apparatus for charging a battery of claim 1, wherein the Zener diode arrangement includes a plurality of Zener diodes connected in series.

12. The apparatus for charging a battery of claim 1, configured to charge a battery including at least one lithium Ion battery cell.

* * * * *